US005802251A

United States Patent [19]

Cohen et al.

[11] Patent Number: 5,802,251

[45] Date of Patent: Sep. 1, 1998

[54] METHOD AND SYSTEM FOR REDUCING PERPLEXITY IN SPEECH RECOGNITION VIA CALLER IDENTIFICATION

[75] Inventors: Paul S. Cohen, Yorktown Heights; John M. Lucassen, New York, both of N.Y.; Elton B. Sherwin, Jr., Stamford, Conn.; Jorge L. Vizcaino, Parkland, Fla.

[73] Assignee: International Business Machines Corporation, Armonk, N.Y.

[21] Appl. No.: 523,755

[22] Filed: Sep. 5, 1995

Related U.S. Application Data

[63] Continuation of Ser. No. 175,707, Dec. 30, 1993, abandoned.

[51] Int. Cl.[6] ........ G10L 3/00

[52] U.S. Cl. ........ 395/2.84; 395/2.79; 395/2.4; 395/2.55

[58] Field of Search ........ 379/38, 67, 88, 379/96, 189, 199; 381/41–43, 45; 395/2, 2.1, 2.4, 2.5, 2.6, 2.55, 2.62, 2.79, 2.84

[56] References Cited

U.S. PATENT DOCUMENTS

| | | | |
|---|---|---|---|
| 4,481,593 | 11/1984 | Bahler | 395/2.62 |
| 4,620,286 | 10/1986 | Smith et al. . | |
| 4,769,845 | 9/1988 | Nakamura . | |
| 4,797,924 | 1/1989 | Schnars et al. . | |
| 4,831,550 | 5/1989 | Katz . | |
| 4,852,173 | 7/1989 | Bahl et al. . | |
| 4,856,066 | 8/1989 | Lemelson . | |
| 4,866,778 | 9/1989 | Baker . | |
| 4,903,305 | 2/1990 | Gillick et al. . | |
| 4,914,703 | 4/1990 | Gillick . | |
| 4,964,167 | 10/1990 | Kunizawa et al. . | |
| 4,984,177 | 1/1991 | Rondel et al. . | |
| 4,984,178 | 1/1991 | Hemphill et al. . | |
| 4,994,983 | 2/1991 | Landell et al. . | |
| 5,003,490 | 3/1991 | Castelaz et al. . | |
| 5,027,406 | 6/1991 | Roberts et al. . | |
| 5,033,087 | 7/1991 | Bahl et al. . | |
| 5,058,167 | 10/1991 | Kimura . | |
| 5,165,095 | 11/1992 | Borcherding | 379/88 |
| 5,167,011 | 11/1992 | Priest . | |
| 5,170,426 | 12/1992 | D'Alessio | 379/38 |
| 5,175,794 | 12/1992 | Tattersall . | |
| 5,216,720 | 6/1993 | Naik et al. | 381/43 |
| 5,222,190 | 6/1993 | Pawate et al. | 395/2 |
| 5,233,681 | 8/1993 | Bahl et al. . | |
| 5,303,299 | 4/1994 | Hunt et al. | 379/88 |
| 5,327,486 | 7/1994 | Wolff et al. | 379/96 |
| 5,353,336 | 10/1994 | Hou et al. | 379/67 |
| 5,502,759 | 3/1996 | Cheng et al. | 379/88 |
| 5,511,111 | 4/1996 | Serbetcioglu et al. | 379/67 |

OTHER PUBLICATIONS

Jelinek, "Continuous speech recognition by statistical methods"; proceedings of the IEEE, vol. 64 No. 4, Apr. 1976, pp. 532–556.

*Primary Examiner*—Tariq R. Hafiz
*Attorney, Agent, or Firm*—Richard A. Tomlin; Andrew J. Dillon

[57] ABSTRACT

A method and system are disclosed for reducing perplexity in a speech recognition system within a telephonic network based upon determined caller identity. In a speech recognition system which processes input frames of speech against stored templates representing speech, a core library of speech templates is created and stored representing a basic vocabulary of speech. Multiple caller-specific libraries of speech templates are also created and stored, each library containing speech templates which represent a specialized vocabulary and pronunciations for a specific geographic location and a particular individual. Additionally, the caller-specific libraries of speech templates are preferably processed to reflect the reduced bandwidth, transmission channel variations and other signal variations introduced into the system via a telephonic network. The identification of a caller is determined upon connection to the network via standard caller identification circuitry and upon detection of a spoken utterance, that utterance is processed against the core library, if the caller's identity cannot be determined, or against a particular caller-specific library, if the caller's identity can be determined, thereby greatly enhancing the efficiency and accuracy of speech recognition by the system.

4 Claims, 3 Drawing Sheets

START 60

ESTABLISH CONNECTION VIA PUBLIC SWITCHED TELEPHONE NETWORK 62

UTTERANCE DETECTED ? 64 NO YES

CALLER IS DETERMINED ? 66 NO YES

PROCESS UTTERANCE AGAINST CORE LIBRARY 72

SELECT PARTICULAR CALLER-SPECIFIC LIBRARY 68

PROCESS UTTERANCE AGAINST CALLER-SPECIFIC LIBRARY 70

UTTERANCE RECOGNIZED ? 74 NO YES

GENERATE ERROR MESSAGE 76

PROCESS UTTERANCE 80

RETURN 78

HOST LOCATION
12
16
COMMUNICATION CHANNEL
30
10
PUBLIC SWITCHED TELEPHONE NETWORK
COMMUNICATION CHANNEL
36
24
26
COMMUNICATION CHANNEL
34
22
COMMUNICATION CHANNEL
32
USER LOCATION
14
18
20

METHOD AND SYSTEM FOR REDUCING PERPLEXITY IN SPEECH RECOGNITION VIA CALLER IDENTIFICATION

This is a continuation of application Ser. No. 08/175,707, filed 30 Dec., 1993 now abandoned.

BACKGROUND OF THE INVENTION

1. Technical Field:

The present invention relates in general to improved speech recognition systems and in particular to an improved method and system for enhanced speech recognition accuracy. Still more particularly, the present invention relates to a method and system for enhanced speech recognition within a telephonic network utilizing caller-specific libraries of speech templates.

2. Description of the Related Art:

Speech recognition is well known in the prior art. The recognition of isolated words from a given vocabulary for a known speaker is perhaps the simplest type of speech recognition and this type of speech recognition has been known for some time. Words within the vocabulary to be recognized are typically prestored as individual templates, each template representing the sound pattern for a word in the vocabulary. When an isolated word is spoken, the system merely compares the word to each individual template which represents the vocabulary. This technique is commonly referred to as whole-word template matching. Many successful speech recognition systems use this technique with dynamic programming to cope with nonlinear time scale variations between the spoken word and the prestored template.

Of greater difficulty is the recognition of continuous speech or speech which contains proper names or place names. Continuous speech, or connected words, have been recognized in the prior art utilizing multiple path dynamic programming. One example of such a system is proposed in "Two Level DP Matching A Dynamic Programming Based Pattern Matching Algorithm For Connected Word Recognition" H. Sakoe, IEEE Transactions on Acoustics Speech and Signal Processing, Volume ASSP-27, No. 6, pages 588–595, December 1979. This paper suggests a two-pass dynamic programming algorithm to find a sequence of word templates which best matches the whole input pattern. Each pass through the system generates a score which indicates the similarity between every template matched against every possible portion of the input pattern. In a second pass the score is then utilized to find the best sequence of templates corresponding to the whole input pattern.

U.S. Pat. No. 5,040,127 proposes a continuous speech recognition system which processes continuous speech by comparing input frames against prestored templates which represent speech and then creating links between records in a linked network for each template under consideration as a potentially recognized individual word. The linked records include ancestor and descendent link records which are stored as indexed data sets with each data set including a symbol representing a template, a sequence indicator representing the relative time the link record was stored and a pointer indicating a link record in the network from which it descends.

The recognition of proper names represents an increase in so-called "perplexity" for speech recognition systems and this difficulty has been recently recognized in U.S. Pat. No. 5,212,730. This patent performs name recognition utilizing text-derived recognition models for recognizing the spoken rendition of proper names which are susceptible to multiple pronunciations. A name recognition technique set forth within this patent involves entering the name-text into a text database which is accessed by designating the name-text and thereafter constructing a selected number of text-derived recognition models from the name-text wherein each text-derived recognition model represents at least one pronunciation of the name. Thereafter, for each attempted access to the text database by a spoken name input the text database is compared with the spoken name input to determine if a match may be accomplished.

U.S. Pat. No. 5,202,952 discloses a large-vocabulary continuous-speech prefiltering and processing system which recognizes speech by converting the utterances to frame data sets wherein each frame data set is smoothed to generate a smooth frame model over a predetermined number of frames. Clusters of word models which are acoustically similar over a succession of frame periods are designated as a resident vocabulary and a cluster score is then generated by the system which includes the likelihood of the smooth frames evaluated utilizing a probability model for the cluster against which the smoothed frame model is being compared.

Each of these systems recognizes that successful speech recognition requires a reduction in the perplexity of a continuous-speech utterance. Publications which address this problem are "Perplexity-A Measure of Difficulty of Speech Recognition Tasks," Journal of the Acoustical Society of America, Volume 62, Supplement No. 1, page S-63, Fall 1977, and the "Continuous Speech Recognition Statistical Methods" in the Handbook of Statistics Volume 2: Classification, Pattern Recognition and Reduction of Dimensionality, pages 549–573, North-Holland Publishing Company, 1982.

In view of the above, it should be apparent that successful speech recognition requires an enhanced ability to distinguish between large numbers of like sounding words, a problem which is particularly difficult with proper names, place names and numbers. It should therefore be apparent that a need exists for a method and system which enhances the accuracy and efficiency of speech recognition.

SUMMARY OF THE INVENTION

It is therefore one object of the present invention to provide an improved speech recognition system.

It is another object of the present invention to provide an improved method and system for enhanced speech recognition accuracy and efficiency.

It is yet another object of the present invention to provide an improved method and system for enhanced speech recognition within a telephonic system utilizing caller-specific libraries of speech templates.

The foregoing objects are achieved as is now described. A method and system are disclosed for reducing perplexity in a speech recognition system within a telephonic network based upon determined caller identity. In a speech recognition system which processes input frames of speech against stored templates representing speech, a core library of speech templates is created and stored representing a basic vocabulary of speech. Multiple caller-specific libraries of speech templates are also created and stored, each library containing speech templates which represent a specialized vocabulary for a specific geographic location and a particular individual. Additionally, the caller-specific libraries of speech templates are preferably processed to reflect the reduced bandwidth, transmission channel variations and other signal variations introduced into the system via a telephonic network. The identification of a caller is determined upon connection to the network via standard caller identification circuitry and upon detection of a spoken utterance, that utterance is processed against the core library, if the caller's identity cannot be determined, or against a particular caller-specific library, if the caller's identity can be determined, thereby greatly enhancing the efficiency and accuracy of speech recognition by the system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
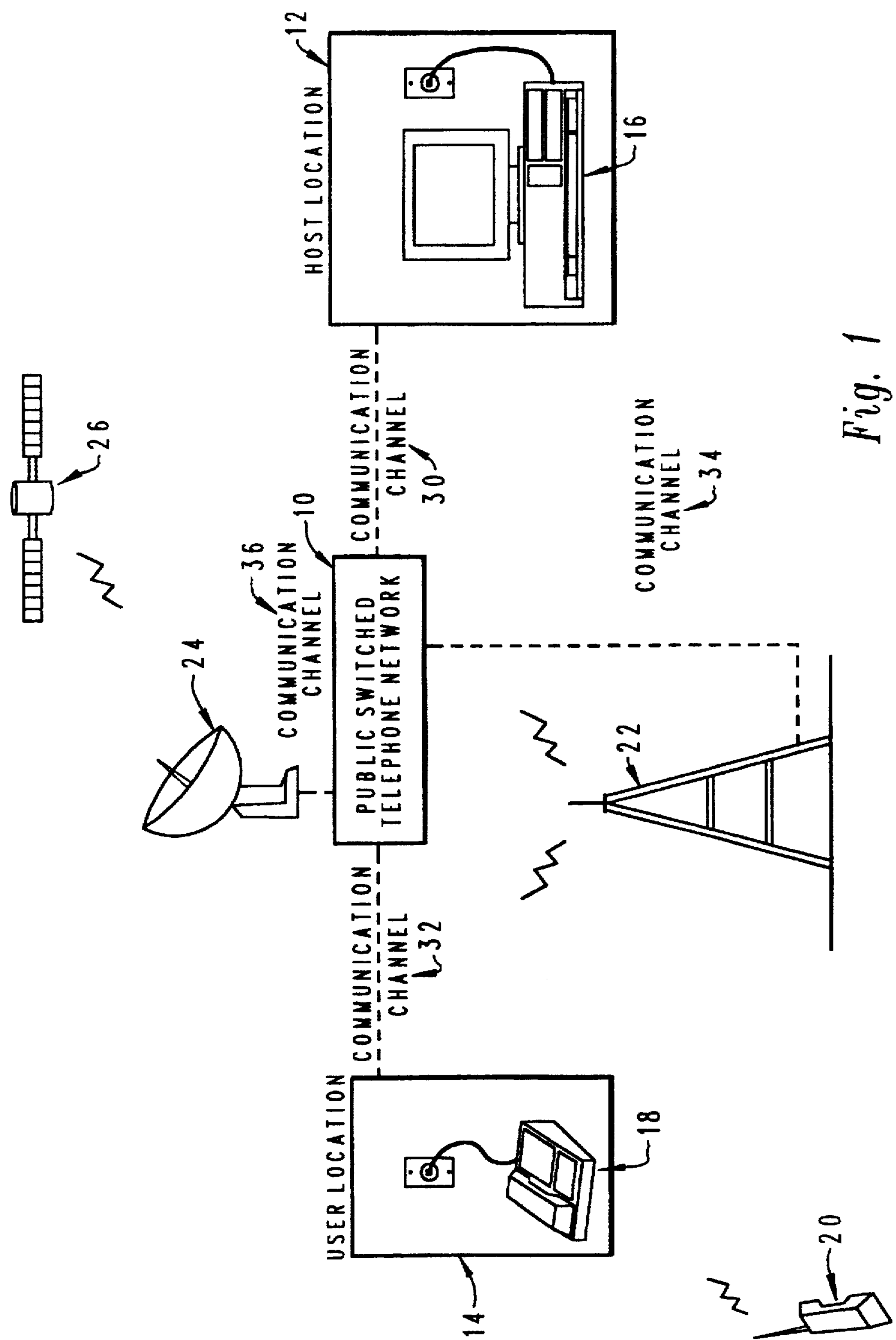
FIG. 1 is a pictorial representation of a distributed telephonic network which may be utilized to implement the method and system of the present invention.

With reference now to the figures and in particular with reference to FIG. 1, there is depicted a distributed telephonic network which may be utilized to implement the method and system of the present invention. As illustrated, multiple user locations are coupled to a host location 12 via a public switched telephone network 10. Public switched telephone network 10 preferably serves to couple multiple users via telephonic communication to host location 12 utilizing any one of the well known techniques for implementing such communication. For example, user location 14 reflects the utilization of a standard telephone 18 which is coupled to host location 12 via communication channel 32, public switched telephone network 10 and communication channel 30. Speech entered by a user utilizing telephone 18 may then be recognized utilizing a speech recognition system implemented utilizing computer 16. Computer 16 may be implemented utilizing any suitable computer, such as a so-called "personal" computer, such as the International Business Machines Corporation PS/2 computer.

Alternately, as depicted within FIG. 1, a user may also utilize a mobile cellular telephone 20 which communicates via radio frequency transmission with radio tower 22. Radio tower 22 is typically coupled to public switched telephone network 10 utilizing a land line communication channel 34. Additionally, modern transcontinental communication is often implemented utilizing satellite communications such as illustrated with satellite 26 and satellite receiver 24. Satellite receiver 24 is then coupled to public switched telephone network 10 via communication channel 36.

As illustrated within FIG. 1, a modern distributed telephonic network provides multiple diverse communication channels which permit a user to establish communication with host location 12. Each such communication channel will clearly vary in those factors which affect the accuracy of a speech recognition system which is implemented utilizing computer 16. For example, certain communication channels may have a reduced bandwidth. Satellite systems may suffer from transmission echo or signal cut-out problems. Additionally, unpredictable signal quality, unknown microphone characteristics at various telephones and various regional accents also contribute to the difficulty of implementing a speech recognition system utilizing a distributed telephonic network such as the one depicted within FIG. 1.

Additionally, selected communication channels within public switched telephone networks often utilize known compression algorithms or various other signal processing techniques which alter and vary the quality and content of a spoken utterance, rendering the recognition of that utterance more difficult than speech recognition within a local system.

Figure 2:
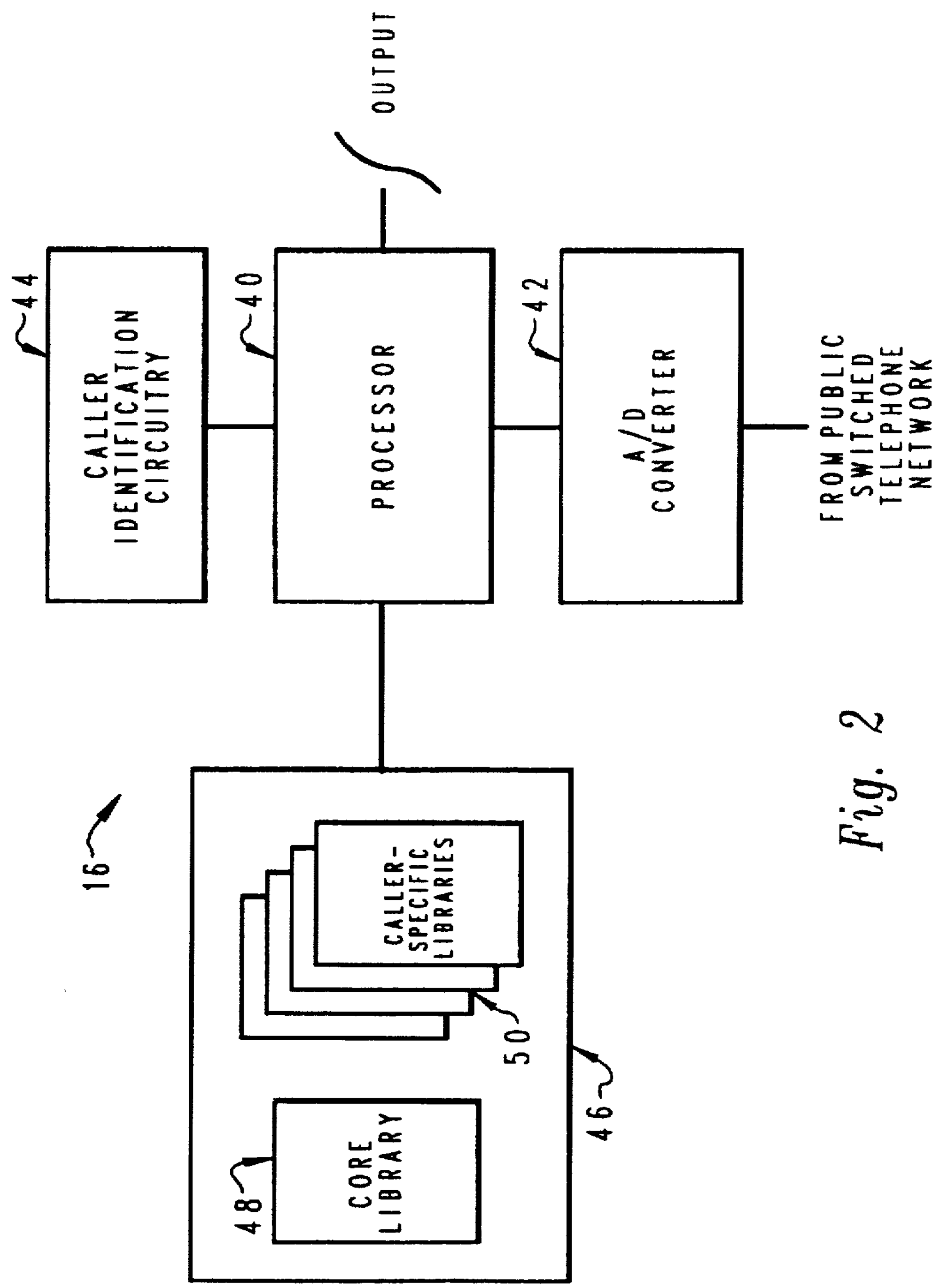
FIG. 2 is a high-level block diagram of the speech recognition system within the host location of FIG. 1.

Referring now to FIG. 2, there is depicted a high-level block diagram of the speech recognition system which may be implemented utilizing computer 16 of FIG. 1. This system illustrates the manner in which caller identification may be utilized to decrease the perplexity of speech recognition in such a system. As illustrated within FIG. 2, a memory 46 is provided within the speech recognition system implemented within computer 16 which includes a core library 48 of speech templates which represent a basic vocabulary of speech. Similarly, multiple caller-specific libraries 50 are also stored within memory 46. Each caller-specific library 50 preferably includes templates which are representative of any specialized vocabulary associated with a particular geographic location which is associated with the communication channel typically utilized by that caller, and the data within those templates has preferably been altered to reflect the bandwidth, microphone characteristics, analog signal quality and various other parameters associated with a particular caller within the distributed telephonic network of FIG. 1.

Those skilled in the art will appreciate that such caller-specific libraries may be created by filtering and processing spoken utterances through a network which models the communication channel through which the spoken utterance must be detected. Further, it should be apparent upon reference to this specification that each caller-specific library may include a series of speech templates which are representative of specific geographic locations, business establishments, or proper names which are germane to a selected geographic location associated with the identity of a selected caller within the distributed telephonic network.

Thus, each time communication is established between a user and the speech recognition system implemented within computer 16 and a speech utterance is detected, that utterance is preferably suitably converted for processing utilizing an analog-to-digital converter 42 and coupled to processor 40. Processor 40 then utilizes caller identification signals which are available from the public switched telephone network in conjunction with caller identification circuitry 44 to establish the identity of a particular caller by identifying the telephone instrument utilized. As those skilled in the art will appreciate, that identity will yield useful information with regard to the geographic location of a particular caller and the communication channel parameters which are typically associated with that particular caller, based upon the typical communication path encountered between that caller and the host location.

Thus, the output of caller identification circuitry 44 is utilized by processor 40 to permit processor 40 to select a particular one of the multiple caller-specific libraries 50 contained within memory 46. The input frame of speech data is then compared to a library of speech templates within memory 46 to determine the content of the speech utterance. Processor 40 may then generate an output signal which may be utilized to control access to other data, implement a particular activity or otherwise provide for the verbal control of a peripheral system.

Upon reference to the foregoing, those skilled in the art will appreciate that core library 48 may be utilized to provide a standardized series of templates for utilization in those situations in which the caller identification may not be determined or, alternatively, core library 48 may comprise a series of basic vocabulary templates which are combined with a caller-specific library to reflect particular geographic specific vocabulary items or those spoken utterances which are greatly affected by transmission parameters within the communication channel. In either event, processor 40 processes an input spoken utterance against a library within memory 46, utilizing caller identification 44 to select a caller-specific library, thereby greatly enhancing the efficiency and accuracy of the speech recognition system implemented within computer 16.

As discussed above with respect to previous known attempts at speech recognition, the templates against which input speech are processed may comprise templates representing individual words, phrases or portions of words. As utilized herein, the term "template" shall mean any stored digital representation which may be utilized by processor 40 to identify an unknown speech utterance.

Figure 3:
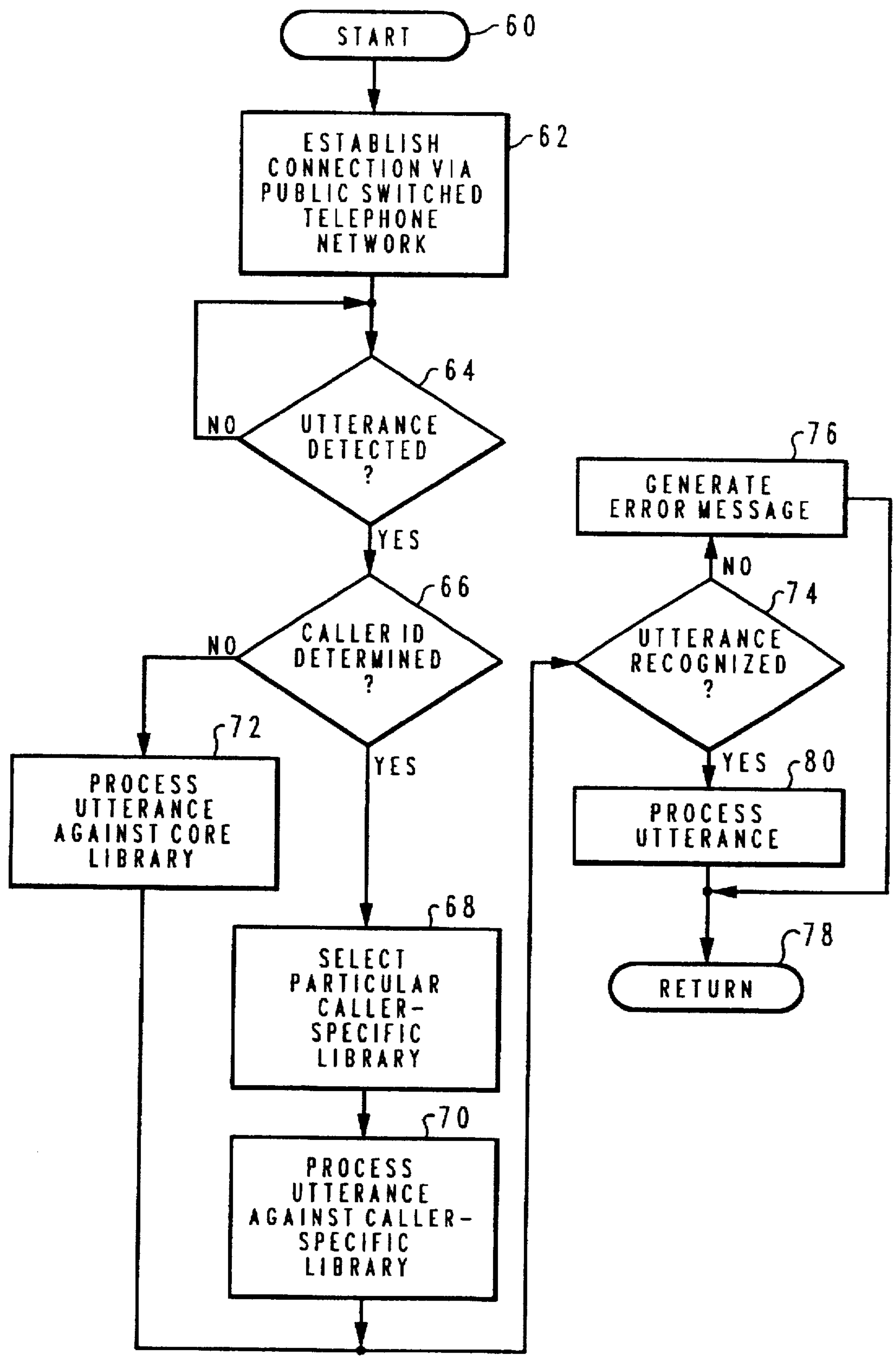
FIG. 3 is a high-level logic flowchart which illustrates a process for implementing the method of the present invention.

Finally, with reference to FIG. 3, there is depicted a high-level logic flowchart which illustrates a process for implementing the method of the present invention. As illustrated, this process begins at block 60 and thereafter passes to block 62. Block 62 illustrates the establishment of a connection by the user to the host location via a public switched telephone network (see FIG. 1). Next, the process passes to block 64. Block 64 illustrates a determination of whether or not a verbal utterance has been detected. If not, the process merely iterates until such time as an utterance has been detected. However, once a verbal utterance has been detected, the process passes to block 66.

Block 66 illustrates a determination of whether or not the caller identification may be determined from the telephonic network. Those skilled in this art will appreciate that caller identification is not universally applicable and thus, the identification of a particular caller accessing the system may not be determined. However, in the event the caller identification has been determined, the process passes to block 68. Block 68 illustrates a selection of a particular caller-specific library from within memory 46 (see FIG. 2). As described above, a particular caller-specific library preferably contains speech utterances which have been processed to accurately reflect the transmission parameters which affect verbal communication within the communication channel. Thus, bandwidth limitations, processing techniques and other parameters which affect verbal communication have been utilized to create a speech template which more accurately reflects utterances which have been processed through that channel. Additionally, specific vocabulary words and pronunciations unique to a particular geographic area associated with the identification of that caller are also included within the caller-specific library. For example, a system which permits the verbal accessing of airline flight schedules will preferably have a series of caller-specific templates which are designed to include utterance representation of geographic locations within the vicinity of the caller's location, as determined utilizing the telephonic network, as more likely choices for recognition than geographic locations which are disposed a great distance from that location.

After selecting a particular caller-specific library based upon the caller identification determination, the process passes to block 70. Block 70 illustrates the processing of the utterance against that caller-specific library. Of course, as described above, the processing of an input speech utterance against a caller-specific library of templates may also include the processing of that utterance against a core library of common utterances which may be easily recognized, despite any degradation which occurs as a result of transmission through a communication channel within the public switched telephone network.

Referring again to block 66, in the event the caller identification cannot be determined, the process passes to block 72. Block 72 illustrates the processing of the input speech utterance against a core library which may be utilized for those circumstances in which a caller identification cannot be determined. Thereafter, after processing the input speech utterance against a core library or a caller-specific library alone or in conjunction with some basic core library, the process passes to block 74. Block 74 illustrates a determination of whether or not the utterance has been recognized. If the utterance is not recognized, that is, there exists no high probability match between that utterance and a known template, the process passes to block 76. Block 76 illustrates the generation of a suitable error message and the process then passes to block 78 and returns. Those skilled in the art will appreciate that communication may be terminated at this point, or the speaker may be urged to attempt once again to pronounce the utterance in a manner which may eventually lead to recognition of that utterance.

Referring again to block 74, in the event the utterance has been recognized, the process passes to block 80. Block 80 then illustrates the processing of that utterance. Those skilled in the art will appreciate that "processing an utterance" means the utilization of the linguistic or intelligence content of that utterance to access other data, perform some function, or in some way interact with a peripheral system of computer 16 to provide an intelligent response to the spoken utterance or transcribe it. Thereafter, the process passes to block 78 and returns.

Upon reference to the foregoing, those skilled in the art will appreciate that by combining a speech recognition system in a plurality of caller-specific libraries of speech templates with an existing caller identification system, a speech recognition system may be provided which is greatly enhanced in efficiency and accuracy as the spoken input utterances may be more accurately recognized by virtue of processing which takes into account signal variation which occurs as a result of the communication channel within a telephonic network and also processing which takes into account variation in geographic-specific vocabulary and pronunciation and other linguistic phenomena.

While the invention has been particularly shown and described with reference to a preferred embodiment, it will be understood by those skilled in the art that various changes in form and detail may be made therein without departing from the spirit and scope of the invention.

We claim:

1. A method for enhancing the accuracy and efficiency of a speech recognition system which processes input frames of speech against stored templates representing speech utilizing a telephonic network, said method comprising the steps of;

creating and storing a core library of speech templates;

creating and storing a plurality of caller-specific libraries of speech templates which each include a vocabulary and pronunciation reflective of a specific geographic location;

attempting to determine an identification of a caller location by utilizing a caller identification system within said telephonic network;

processing an input speech utterance against said core library of speech templates in the event an identification of said caller location within said telephone network is not determined; and processing an input speech utterance against a particular one of said plurality of caller-specific libraries of speech templates in response to a determination of an identification of said caller location within said telephonic network.

2. The method for enhancing the accuracy and efficiency of a speech recognition system which processes input frames of speech against stored templates representing speech via a telephonic network according to claim 1, wherein said step of creating and storing a plurality of caller-specific libraries of speech templates comprises the step of creating and storing a plurality of caller-specific libraries of speech templates which are processed to reflect variations in each speech utterance which occur as a result of a transmission of each speech utterance within said telephonic network.

3. A system for enhancing the accuracy and efficiency of a speech recognition system which processes input frames of speech against stored templates representing speech utilizing a telephonic network, said system comprising:

means for creating and storing a core library of speech templates;

means for creating and storing a plurality of caller-specific libraries of speech templates which each include a vocabulary and pronunciation reflective of a specific geographical location;

means for attempting to determine an identification of a caller location utilizing a caller identification system within said telephonic network;

means for processing an input speech utterance against said core library of speech templates in the event an identification of said caller location within said telephone network is not determined; and means for processing an input speech utterance against a particular one of said plurality of caller-specific libraries of speech templates in response to a determination of an identification of said caller location within said telephonic network.

4. The system for enhancing the accuracy and efficiency of a speech recognition system which processes input frames of speech against stored templates representing speech via a telephonic network according to claim 5, wherein said means for creating and storing a plurality of caller-specific libraries of speech templates comprises means for creating and storing a plurality of caller-specific libraries of speech templates which are processed to reflect variations in each speech utterance which occur as a result of a transmission of each speech utterance within said telephonic network.

* * * * *

UNITED STATES PATENT AND TRADEMARK OFFICE

CERTIFICATE OF CORRECTION

PATENT NO. : 5,802,251

DATED : September 1, 1998

INVENTOR(S) : Cohen et al.

It is certified that error appears in the above-identified patent and that said Letters Patent is hereby corrected as shown below:

Column 8, Line 24: Please change "claim 5" to --claim 3--

Signed and Sealed this

Twelfth Day of January, 1999

*Attest:*

*Attesting Officer*

*Acting Commissioner of Patents and Trademarks*